(12) United States Patent
Narayanamurthy et al.

(10) Patent No.: US 8,660,708 B2
(45) Date of Patent: Feb. 25, 2014

(54) METHOD AND SYSTEM FOR HEALTHY HOME ZONING CONTROL CONFIGURED FOR EFFICIENT ENERGY USE AND CONSERVATION OF ENERGY RESOURCES

(75) Inventors: Ramachandran Narayanamurthy, El Cerrito, CA (US); Joshua R. Plaisted, Oakland, CA (US)

(73) Assignee: PVT Solar, Inc., Fremont, CA (US)

( * ) Notice: Subject to any disclaimer, the term of this patent is extended or adjusted under 35 U.S.C. 154(b) by 459 days.

(21) Appl. No.: 13/151,989

(22) Filed: Jun. 2, 2011

(65) Prior Publication Data

US 2011/0238223 A1 Sep. 29, 2011

(51) Int. Cl.
G05D 23/00 (2006.01)
(52) U.S. Cl.
USPC .......................... 700/299; 700/276; 236/1 B
(58) Field of Classification Search
USPC .......... 700/276–278, 282, 299, 300; 236/1 B, 236/1 C, 44 C
See application file for complete search history.

(56) References Cited

U.S. PATENT DOCUMENTS 4,069,971 A * 1/1978 Swanson ....................... 126/595
5,976,010 A * 11/1999 Reese et al. ................... 454/229
8,219,249 B2 * 7/2012 Harrod et al. ................. 700/276
2010/0206297 A1 * 8/2010 Wilkinson .................... 126/628
2011/0180058 A1 * 7/2011 MacKay et al. .............. 126/605

OTHER PUBLICATIONS

"U-SNAP"; Mar. 20, 2009; U-SNAP Alliance; whtie paper; pp. 1-5.*

* cited by examiner

Primary Examiner — Sean P. Schechtman
Assistant Examiner — Chad Rapp
(74) Attorney, Agent, or Firm — Armstrong Teasdale LLP

(57) ABSTRACT

A system provides space conditioning zone control in a building for efficient energy use and conservation of energy resources. The system includes an energy transfer module coupled to a solar thermal system to receive a first airflow and an auxiliary thermal module coupled to the energy transfer module for processing a return airflow to provide a conditioned airflow for one or more spatial zones. The system further includes a zone controller coupled directly to the auxiliary thermal module and a thermostat in each spatial zone for operating the auxiliary thermal module. Furthermore, the system includes a master control module wirelessly communicated with each thermostat and configured to operate the energy transfer module. The master control module initiates a transfer of the first airflow based upon a first setpoint before the zone controller initiates a generation and transfer of the conditioned airflow based upon a second setpoint.

20 Claims, 7 Drawing Sheets

METHOD AND SYSTEM FOR HEALTHY HOME ZONING CONTROL CONFIGURED FOR EFFICIENT ENERGY USE AND CONSERVATION OF ENERGY RESOURCES

CROSS-REFERENCES TO RELATED APPLICATIONS

Not Applicable

STATEMENT AS TO RIGHTS TO INVENTIONS MADE UNDER FEDERALLY SPONSORED RESEARCH AND DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates to solar energy application for home space conditioning and zoning control. More particularly, the present invention provides a system and method for providing space conditioning zone control for a building structure utilizing solar thermal energy. Merely, by way of example, the present invention has been applied to a home energy system including an energy transfer module controlled by a system controller communicating wirelessly with multiple thermostats coupled to a zone controller for providing space conditioning zone control, but it would be recognized that the invention has a much broader range of applications.

Over the past centuries, the world population of human beings has exploded. Along with the population, demand for resources has also grown explosively. Such resources include raw materials such as wood, iron, and copper and energy, such as fossil fuels, including coal and oil. Industrial countries worldwide project more increases in oil consumption for transportation and heating purposes from developing nations such as China and India. Obviously, our daily lives depend, for the most part, upon oil or other forms of fossil fuel, which are becoming scarce as it becomes depleted.

Along with the depletion of our fossil fuel resources, our planet has experienced a global warming phenomena, known as "global warming," and brought to our foremost attention by our former Vice President Al Gore. Global warming is known as an increase in an average temperature of the Earth's air near its surface, which is projected to continue at a rapid pace. Warming is believed to be caused by greenhouse cases, which are derived, in part, from use of fossil fuels. The increase in temperature is expected to cause extreme weather conditions and a drastic size reduction of the polar ice caps, which in turn will lead to higher sea levels and an increase in the rate of warming. Ultimately, other effects include mass species extinctions, and possibly other uncertainties that may be detrimental to human beings.

Much if not all of the useful energy found on the Earth comes from our sun. Generally all common plant life on the Earth achieves life using photosynthesis processes from sun light. Fossil fuels such as oil were also developed from biological materials derived from energy associated with the sun. For life on the planet Earth, the sun has been our most important energy source and fuel for modern day solar energy. Solar energy possesses many characteristics that are very desirable! Solar energy is renewable, clean, abundant, and often widespread. Accordingly, solar panels have been developed to convert sunlight into energy. Most solar energy systems today use "PV" technology. They convert sunlight directly into the electricity that you use to light your home, or power your appliances. As merely another example, solar thermal panels also are developed to convert electromagnetic radiation from the sun into thermal energy for heating homes, running certain industrial processes, or driving high grade turbines to generate electricity. In fact, solar photovoltaic panels also generate heat as a side product. Solar panels are generally composed of an array of solar (PV and/or thermal) cells, which are interconnected to each other. The cells are often arranged in series and/or parallel groups of cells in series. Accordingly, solar panels have great potential to benefit our nation, security, and human users. They can even diversify our energy requirements and reduce the world's dependence on oil and other potentially detrimental sources of energy.

Although solar panels have been used successful for certain applications, there are still certain limitations. Solar cells are often costly. Depending upon the geographic region, there are often financial subsidies from governmental entities for purchasing solar panels, which often cannot compete with the direct purchase of electricity from public power companies. Additionally, most PV solar energy systems only utilize about 15% of the captured sun's energy. The remaining energy, mostly in the form of thermal energy, remains untapped. Moreover, conventional home utility modules are often operated alone for providing home space conditioning without coordination with solar modules installed for a building structure. Especially for the building structure including multiple spatial zones, due to variation in occupancy status and seasoning status associated with each spatial zone, energy cost of the conventional operation is very high and very inefficient. A healthy home energy system including a coordinated mechanism for operating both an auxiliary thermal module and a solar module installed for a building structure to provide efficient home space conditioning is desired. In particular, there is no existing method to program the control setting for automatically adjusting building comfort band associated with each of the multiple zones for maximizing the solar thermal energy utilization before initiating an auxiliary thermal module for providing home heating, home cooling, and ventilation. These and other limitations are described throughout the present specification, and may be described in more detail below.

From the above, it is seen that techniques for improving operation of an integrated solar energy system are highly desired.

BRIEF SUMMARY OF THE INVENTION

The present invention relates to operation of a home energy system for building zone control. More particularly, the present invention provides a system and method for providing space conditioning zone control for a building structure with multiple spatial zones within a home energy system utilizing solar thermal energy. Merely, by way of example, the present invention has been applied to transfer solar thermal energy in coordination with an operation of auxiliary thermal module for providing space conditioning for multiple spatial zones of a building structure with efficient energy use and conservation of energy resources, but it would be recognized that the invention has a much broader range of applications.

In a specific embodiment, the present invention provides an integrated healthy home system that optimizes the utilization thermal energy and eliminates any conflict with auxiliary thermal system. The system has a controller for at least a thermal energy transfer module within a building and one or more thermostats configured to communicate with the controller in a dedicate network for replicate an integrated zone control for multiple conditioned spatial zones of the building. Of course, there can be other variations, modifications, and alternatives.

In another specific embodiment, the present invention provides a system for providing space conditioning zone control in a building for efficient energy use and conservation of energy resources. The system includes an energy transfer module coupled to a solar thermal system disposed outdoor of a building having one or more spatial zones. The energy transfer module is configured to receive a first airflow collected from the solar thermal system. The system further includes an auxiliary thermal module coupled to the energy transfer module for processing a return airflow from the one or more spatial zones to provide a conditioned airflow. The one or more spatial zones include at least a first spatial zone and a second spatial zone. Additionally, the system includes a first thermostat device configured with the first spatial zone and a second thermostat device configured with the second spatial zone. The first thermostat device includes a first wireless communication device and the second thermostat device includes a second wireless communication device. The system further includes a zone controller coupled directly to the auxiliary thermal module and each of the first thermostat device and the second thermostat device. The zone controller has a first set of setpoints determined respectively by each thermostat device for operating the auxiliary thermal module. Furthermore, the system includes a master control module coupled to the energy transfer module and to the first thermostat device via the first wireless communication device and to the second thermostat device via the second wireless communication device. The master control module is decoupled and free from direct communication with the zone controller. The master control module has a second set of setpoints for operating the energy transfer module for transferring either the first airflow or both the first airflow and the conditioned airflow to the one or more spatial zones. In a specific embodiment, the master control module is configured to initiate a transfer of the first airflow based upon the first set of setpoints before the zone controller is to initiate a generation and transfer of the conditioned airflow based upon the second set of setpoints.

In yet another embodiment, the system controller further includes a virtual thermostat interface for remotely setting temperature setpoints and modes of operation for each thermostat device based on one or more operation programs selected from a daily period program, a weekly schedule program, and/or an occupancy program of each of the one or more spatial zones, the modes of operation including heating mode, cooling mode, off mode, fan-auto mode, or fan-on mode for automatic operation or a manual mode for user override setting.

In an alternative specific embodiment, the present invention provides a method for providing space conditioning zone control to multiple spatial zones in a home energy system for efficient energy use and conservation of energy resources. The method includes providing a home energy system including an energy transfer module, a solar thermal module, and an auxiliary thermal module associated with a building having one or more spatial zones. The one or more spatial zones include at least a first spatial zone and a second spatial zone. The method further includes initiating an operation of the energy transfer module by a system controller for delivering a first airflow collected by the solar thermal module. Additionally, the method includes transferring first information using a first wireless communication device from a first thermostat device to the system controller. The first thermostat device is configured with the first spatial zone and coupled to a zone controller. The method also includes transferring second information using a second wireless communication device from a second thermostat device to the system controller. The second thermostat device is configured with the second spatial zone and coupled to the zone controller. Furthermore, the method includes operating the system controller based upon a first set of setpoints in association with the first information and the second information for controlling at least a distribution of the first airflow to the one or more spatial zones. The system controller is decoupled and substantially free from direct communication with the zone controller. Moreover, the method includes initiating an operation of the auxiliary thermal module by the zone controller based upon a second set of setpoints for receiving a return airflow from the one or more spatial zones, processing the return airflow, and providing a conditioned airflow. In an embodiment, the operation of the auxiliary thermal module to transfer the conditioned airflow based upon the second set of setpoints is initiated after the operation of the energy transfer module to transfer the first airflow based upon the first set of setpoints such as the conditioned airflow to merge with the first airflow into the one or more spatial zones.

In yet still another specific embodiment, the method includes configuring the system controller to wireless communicate with the one or more thermostat devices by mating a Zigbee USB stick plugged in the system controller with a Zigbee U-Snap module on each of the one or more thermostat devices. Additionally, the method includes commissioning each of the one or more thermostat devices through a sequence of steps including a step of powering down both the system controller and the thermostat device, a step of inserting the Zigbee U-snap module to the thermostat device; a step of inserting a battery to the thermostat device; a step of inserting the Zigbee USB stick to the system controller; a step of powering up the system controller; a step of forming a Zigbee network between the system controller and the thermostat device; a step of validating the Zigbee network; a step of closing the Zigbee network; and a step of enabling the thermostat device by using the Zigbee network from a user interface associated with the system controller. Therefore, the system controller establishes a wireless communication with each thermostat device for transferring and updating information about temperature setpoints and modes of operation within a predetermined time period.

Many benefits are achieved by way of the present invention over conventional techniques. For example, the present technique provides an easy to use process that relies upon an advanced solar energy based healthy home system integrated with conventional technologies such as solar PV modules, thermostat devices, air handler, air conditioning module and furnace, although other auxiliary thermal systems can also be used. Additionally, the system and method provide a coordinated control over the solar thermal energy utilization in home space conditioning application in a building structure with multiple spatial zones. It not only provides a process that is compatible with any updated solar thermal system without substantial modifications to equipment and processes but also provides optimized thermal energy distributions with efficient energy use and conservation of energy resources. Preferably, the invention provide a method that eliminates any conflict between operations of a solar thermal system and an auxiliary thermal system associated with energy transfer and space conditioning thermal loads.

In a specific embodiment, the invention provides a home energy system and a method for initiating a solar thermal energy transfer from a solar thermal module by a system controller within a programmed comfort band before initiating an operation of auxiliary thermal module to provide conventional space conditioning when temperature is over/under an extended setpoint. The energy production process, energy transfer process, and the space conditioning process can be configured remotely using a virtual thermostat interface associated with the system controller and coordinated a for providing space conditioning zone control for each of the multiple spatial zones using a zone controller that is substantially decoupled from the system controller. In a specific embodiment, the space conditioning for multiple spatial zones can be controlled in coordination with the whole home energy system. In a preferred embodiment, the zone controller is a HVAC controller or a Furnace controller configured to couple a thermostat device disposed in each of multiple spatial zones and configured to use setpoints determined by the thermostat device for controlling an operation of a HVAC module or a furnace to provide a conditioned airflow and controlling an operation of an air handler unit to deliver the conditioned airflow to each of multiple spatial zones. The present system controller is configured to wirelessly communicate with each thermostat device, though it is free from direct communication with the zone controller. By way of extending setpoints on the zone controller, a novel solar thermal energy transfer operation is initiated to heat and/or cool a building structure before initiating a costly HVAC/Furnace system based on conventional method. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION

The present invention relates to operation of a home energy system for building zone control. More particularly, the present invention provides a system and method for providing space conditioning zone control for a building structure with multiple spatial zones within a home energy system utilizing solar thermal energy. Merely, by way of example, the present invention has been applied to transfer solar thermal energy in coordination with an operation of auxiliary thermal module for providing space conditioning for multiple spatial zones of a building structure with efficient energy use and conservation of energy resources, but it would be recognized that the invention has a much broader range of applications.

Figure 1:
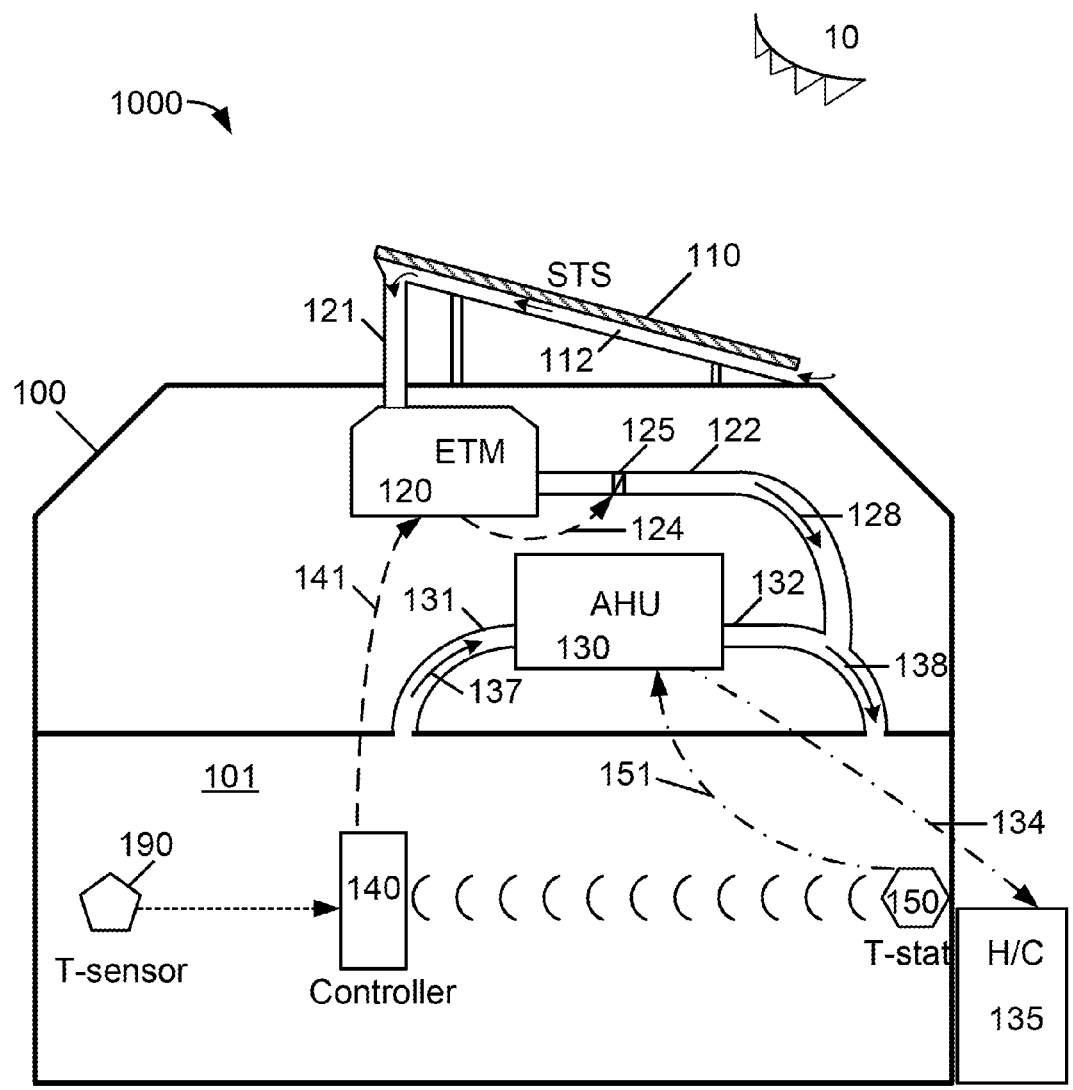
FIG. 1 is a simplified diagram of a home energy system with space conditioning zone control according to an embodiment of the present invention.

FIG. 1 is a simplified diagram of a home energy system with space conditioning zone control according to an embodiment of the present invention. This diagram is merely an example, which should not unduly limit the scope of the claims herein. One of ordinary skill in the art would recognize other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

As shown, the home energy system, or simply referred as the system 1000, is associated with a building structure 100 configured to provide space conditioning zone control to an interior spatial zone 101. The system 1000 includes a system controller 140 configured to operate an energy transfer module (ETM) 120 coupled to a solar thermal module 110 installed for the building structure 100 for generating the solar energy from solar source Sun 10. The solar thermal module is made by one or more solar panels (either PV panels to pure thermal panels, or any combination of both). The system controller 140 is configured to monitor the operation of the solar thermal module 110 to collecting ambient air into a plenum structure 112 underneath the solar panels for carrying thermal energy resulted from the solar energy. The ETM 120 is configured to draw the air via a gas inlet 121 from the plenum structure 112 and process the air as a thermal medium for transferring the thermal energy for various building utility applications. One application of the ETM 120 includes providing space heating at least in terms of a distribution of a first airflow 128 carrying thermal energy toward a gas outlet 122 connected to one particular spatial zone. The system controller 140 controls the operation of ETM for the distribution of the first airflow 128 at least through a zone damper 125 disposed within the gas outlet 122.

Additionally, the system 1000 includes an auxiliary thermal module (ATM) having a heating/cooling (H/C) module 135 and an air handler unit (AHU) 130 for providing a conditioned airflow 138 for indoor space heating or cooling. The heating module could be a conventional furnace and the cooling module could be a HVAC module or a desiccant wheel device. The AHU 130 is configured to couple a gas outlet 132 with the gas outlet 122 of ETM 120 for mixing the conditioned airflow 138 at least partially with the first airflow 128 to form a second airflow being directed to an indoor space 101 of the building 100. The ATM is controlled by a thermostat device 150 disposed in the indoor space 101 for measuring at least an indoor temperature and setting temperature setpoint and programming modes of operation for the auxiliary thermal module. In a specific embodiment, the system controller 140 is further configured to establish a wireless communication network with the thermostat device 150 so that the system controller 140 can synchronize the energy transfer module operation based on a first set of control settings with the auxiliary module operation based on a second set of settings for the thermostat. Further the operation of ETM 120 controlled by the system controller 140 is configured to transfer setting information to the thermostat device 150 for remotely updating the setting of the thermostat device for operating the ATM for best utilizing solar thermal energy in space conditioning control. In another specific embodiment, the system controller 140 also is configured to read indoor temperature from a RTD temperature sensor 190 and use the information for controlling the ETM 120 to avoid conflict with the modes of operation of the auxiliary thermal module.

In a specific embodiment, the system 1000 forms a healthy home energy system having an integrated solar energy system such as an Echo solar system provided by EchoFirst, Inc. and the like. The present integrated solar energy system combines PV electrical power generation and thermal heating and cooling associated with the building 100 is complementary to existing home energy management and processing. For example, the air conditioning module can be one of auxiliary thermal loads within the existing home energy system. However, by using a dedicated system controller configured to communicate with one or more thermostats disposed in multiple building spatial zones, the thermal component in the integrated solar energy system can be better utilized to best match the thermal generation components to the most appropriate loads for different spatial zones. As illustrated in this specification, the present system is developed to improve and/or maximize the utilization of the available energy from the solar energy system in a comprehensive energy management including software control algorithms, hardware configurations, and external communication capabilities.

In another specific embodiment, the thermostat device 150 is coupled to the air handler unit 130 via a connection 153, allowing the programmed modes of operation or commands to be sent to the air handler unit 130. The air handler unit 130 includes at least a gas inlet 131 coupled to the indoor spatial zone 101 for collecting a return airflow 137. The air handler unit 130 is coupled with the heating/cooling unit 135 via a connection 134 to process the return airflow 137 and produce a conditioned air flow to a gas outlet 132. The modes of operation of commands from the thermostat device 150 are designed to drive several control elements such as a fan in air handler unit 130, a heater or condenser in the heating/cooling unit 135, an air damper in the gas outlet 132, and others. In yet another specific embodiment, the thermostat device 150 is configured to be set at a specific mode of operation so that a wireless communication between the system controller 140 and the thermostat device 150 can be established. The wireless communication allows the system controller 140 to read indoor temperature measured by the thermostat device 150 and the mode settings of the thermostat device 150 for controlling the air handler unit and heating/cooling unit. For example, the thermostat device 150 is a CT-30 model thermostat provided by EchoFirst, Inc. and the like. Furthermore, the system controller 140 is able to replicate the above information to the energy transfer module 120 and the operation of the solar thermal system 110. In particular, the system controller 140 at least controls the operation of a blower (not explicitly shown) in the energy transfer module and an air damper in one or more outlets to control a distribution of the first airflow 128 for delivering proper managed thermal energy in consistent with the space conditioning control set by the thermostat for the specific spatial zones. The first airflow 128 is then mixed with the conditioned airflow from the air handler unit to form the second airflow 138 that eventually is delivered to the indoor space 101 with a desired space conditioning zone control within the home energy system. Of course, there are many variations, alternatives, and modifications. For example, the system controller 140 is also configured to receive indoor temperature information from a RTD temperature sensor disposed in the target spatial zone of the building and totally independent from the thermostat. More information about the system hardware and software for providing the space conditioning zone control can be found throughout the specification and particularly below.

Figure 2:
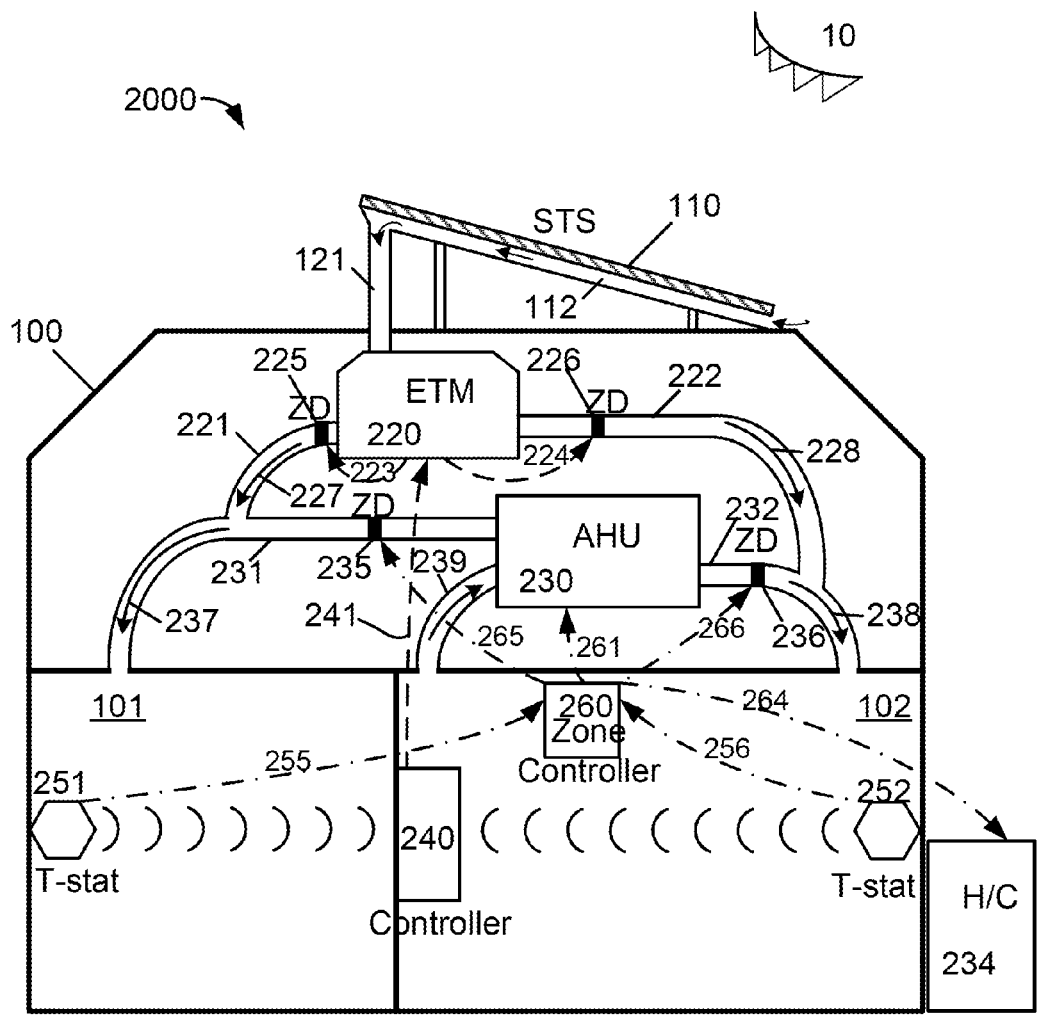
FIG. 2 is a simplified diagram of a home energy system with space conditioning zone control according to an alternative embodiment of the present invention.

FIG. 2 is a simplified diagram of a home energy system with space conditioning zone control according to an alternative embodiment of the present invention. This diagram is merely an example, which should not unduly limit the scope of the claims herein. One of ordinary skill in the art would recognize other variations, modifications, and alternatives. As shown, the healthy home system, or simply referred as the system 2000, is substantially the same as the system 1000 associated with the building structure 100 for providing space conditioning zone control to multiple indoor spatial zones 101, 102 or more. In a specific embodiment, the system 2000 includes an energy transfer module 220 coupled to the solar thermal module 110 and to an air handler unit 230. The solar thermal module 110 is the same as that within the system 1000 for producing both electrical power using its PV unit and thermal power using both PV unit and thermal unit. Part of the thermal power is carried by an airflow drawn from ambient into the ETM 220 via the gas inlet 121. A dedicated system controller 240 is applied to transfer digital information (control commands) 239 to the ETM 220 based upon a first set of control commands or setpoints to operate heat exchange processes for utilizing the thermal energy carried in the airflow and modulate the airflow for additional usage such as space heating and more. In particular, the first set of setpoints include at least a cooling setpoint designated for a cooling season operation and a heating setpoint designated for a heating season operation. For example, if the indoor temperature is found to be lower than the heating setpoint, the system controller initiates an operation of the ETM to transfer the airflow carrying solar thermal energy into the indoor space zones for space heating.

In a specific embodiment, the ETM 220 includes at least two gas outlets 221 and 222 designated for distributing the airflow partially for space heating in two or more spatial zones. In the two gas outlets 221 and 222 two zone dampers 225 and 226 are respectively installed for controlling the flux of the airflow passing through. The ETM 220 includes a module controller (built in but not explicitly shown) which further applies a series of control commands or a first set of setpoints determined for the system controller 240 to operate ETM zone dampers 225 and 226 for controlling the distribution of the airflows 227 and 228 respectively through the two outlets 221 and 222. The first set of setpoints used by the system controller 240 includes at least a first cooling setpoint assigned for each spatial zone in a cooling mode of the system and a first heating setpoint assigned for the same spatial zone in a heating mode of the system.

In another embodiment, the air handler unit (AHU) 230 and Heating/Cooling unit 234 forms an auxiliary thermal module (e.g., a furnace or an air conditioner) for producing a conditioned airflow for providing space conditioning (heating or cooling) for the building structure or home dwelling 100. The Heating/Cooling unit 234 of the auxiliary thermal module can be a conventional HVAC system or a typical electrical or gas operated furnace. In a specific embodiment, the Heating/Cooling unit 234 is an apparatus coupled to the solar thermal system 110 using a desiccant material as a cooling medium utilizing solar thermal energy for providing space cooling. As shown in FIG. 2, the AHU 230 includes a gas inlet 239 for receiving a return airflow from one of the multiple indoor spatial zones. The auxiliary thermal module operated under the zone controller 260 is configured to process the return airflow based on a second set of temperature setpoints and a current indoor temperature and to produce a conditioned airflow with a desired temperature. The second set of setpoints used by the zone controller 260 includes at least a second cooling setpoint associated with a spatial zone in a cooling mode set by the thermostat device in the particular spatial zone and a second heating setpoint associated with the same spatial zone. According to embodiments of the present invention, the second cooling setpoint is set higher than the first cooling setpoint to define a first comfort band for the cooling season and the second heating setpoint is set lower than the first heating setpoint to define a second comfort band for the heating season. Therefore, the system controller 240, assumed in a cooling season, initiates an operation of the ETM 220 to deliver a first airflow (e.g., supply a radiation-cooled first airflow during the night time) based on a first set of setpoints if the current indoor temperature of the particular spatial zone falls into a range of the first comfort band but does not initiate operation of the auxiliary thermal module to provide energy-cost conditioned airflow. Only when indoor temperature surpasses the first cooling setpoint does the zone controller 260 initiate the operation of an air conditioner to provide cooled airflow into the spatial zone for meeting zone conditioning need. Similarly, in a heating season, the system controller 240 first initiates operation of ETM 220 to provide the first airflow carrying solar thermal energy to the spatial zone when the indoor temperature falls into the second comfort band, without initiating operation of a furnace to use additional energy for providing heated airflow. Only when indoor temperature falls below the second heating setpoint, does the zone controller 260 initiate the supply of heated airflow from the furnace. In another specific embodiment, the AHU 230 includes two outlets 231 and 232 respectively coupled to the outlets 221 and 222 of the ETM 220, so that the conditioned airflow can be partially mixed with the airflow distributed from the ETM 220. In particular, the gas outlet 231 couples between the outlet 221 and a first indoor spatial zone 101 and the gas outlet 232 couples between the outler 222 and a second indoor spatial zone 102. A first airflow 227, 238 out of two outlets 221, 222 from the ETM 220 is respectively mixed partially with the conditioned airflow from AHU 230 to form a second airflow 237, 238 being delivered for space conditioning in the corresponding first and second spatial zones 101, 102.

Referring to FIG. 2, each outlet 231 or 232 of the AHU 230 has an air damper 235 or 236 that is power controlled to open or close. In a specific embodiment, the AHU 230 is controlled by a zone controller 260 for handling the distribution of the conditioned airflow to desired spatial zones. The zone controller 260 is configured to receive control commands from a first thermostat device 251 and a second thermostat device 252 respectively disposed in the first spatial zone 101 and the second spatial zone 102. The control commands include at least a second set of setpoints and pre-programmed or on-site inputted modes of operation for the auxiliary thermal module. Based upon the second set of setpoints, the zone controller 260 is operated to control the heating/cooling unit for generating the conditioned airflow and control the air handler unit to distribute the conditioned airflows (237 and 238) through two powered air damper 235 and 236 respectively into the first and second spatial zones 101 and 102. In another specific embodiment, each of the communication connections between the zone controller 260 and those control elements in AHU, Heating/Cooling unit, and two powered air dampers can be a direct wired connection. In an implementation, the zone controller 260 is a ZCS4 model zone controller provided by EchoFirst, Inc. and the like, each of the thermostat devices 251 and 252 is a CT-30 model thermostat provided by EchoFirst, Inc. and the like. The zone controller 260 is substantially decoupled and free from direct communication with the system controller 240.

In a specific alternative embodiment, the coupling between the ETM 220 and the AHU 230 for providing space conditioning zone control is synchronized by using the system controller 240 and its dedicated communication with the two thermostat devices 251 and 252. The system controller 240 is configured to establish a wireless communication network with one or more thermostat devices disposed in one or more spatial zones of the building structure. In an embodiment, the thermostat device includes a wireless communication device for establishing a dedicated local network connection with another wireless module plugged in an I/O port of the system controller. The dedicated wireless local network allows a two-way communication between the system controller and each of the thermostat devices disposed in each spatial zones. In one way, it allows the system controller 260 to receive information from each thermostat device about an indoor temperature within a particular spatial zone and modes of operation associated with the particular thermostat device. In another way, the system controller 260 is able to transfer system information or mode settings for remotely setting or updating each thermostat device in the field. The thermostat device includes a built-in temperature sensor for measuring the temperature of the indoor spatial zone where it is disposed. The thermostat device is also configured to have one or more modes of operation for operating the auxiliary thermal module for space conditioning control including heating, cooling, off, fan-on, fan-auto, and the likes. Each thermostat device is directly coupled to the zone controller and is able to transfer the modes of operation to determine the setpoints that is used by the zone controller for controlling the operation of the auxiliary thermal module.

In another embodiment, the modes of operation of each thermostat device include a functionality allowing user to input or program mode settings from a local interface. For example, the local interface can a touch screen display built on each thermostat device. The modes of operation of the thermostat device also include another functionality allowing the thermostat device to be enabled for wireless communication with the system controller. When the thermostat device is enabled at a simple mode for wireless communication, the system controller 240 is able to form the two-way communication with each thermostat device disposed in each of to synchronize the control of ETM 220 and the auxiliary thermal module to provide space conditioning zone control with best utilization of solar thermal energy within the healthy home energy system. Of course, there are many variations, alternatives, and modifications. For example, the system 2000 can have two or more zones for the ETM 220 for distributing the first airflow and as much as four outlets for AHU 230 that partially couple with the two ETM zones for partially mixing the conditioned airflow with the first airflow before delivering the second airflow partially into each of multiple spatial zones of the building or dwelling 100. In an example, the space conditioning operation can be controlled for up to four spatial zones by the system 2000. More details about the hardware and software of the system controller, thermostat and zone controller can be found throughout the specification and particularly below.

In a specific embodiment, the present invention provides a system with a custom manufactured analog signal conditioning board. In one or more embodiments, the system can include at least a system controller based on an enterprise server and configured to communicate with several local controllers or control elements through one or more networks. In one or more embodiments, the controller components in a CPU/communications module connected to an interface/signal conditioning board which also carries the power supply, motor/blower controls, associated circuitry, and screw terminals for industrial strength connections to the controller. A benefit of the control is that it reduces the controller board count. In a preferred embodiment, the CPU/communication functions are integrated directly within the main board. As noted, the above controller configurations are merely examples, which should not unduly limit the scope of the claims herein. One of ordinary skill in the art would recognize other variations, modifications, and alternatives, Further details of the present system, including controller and database, can be found throughout the present specification and more particularly below.

Figure 3:
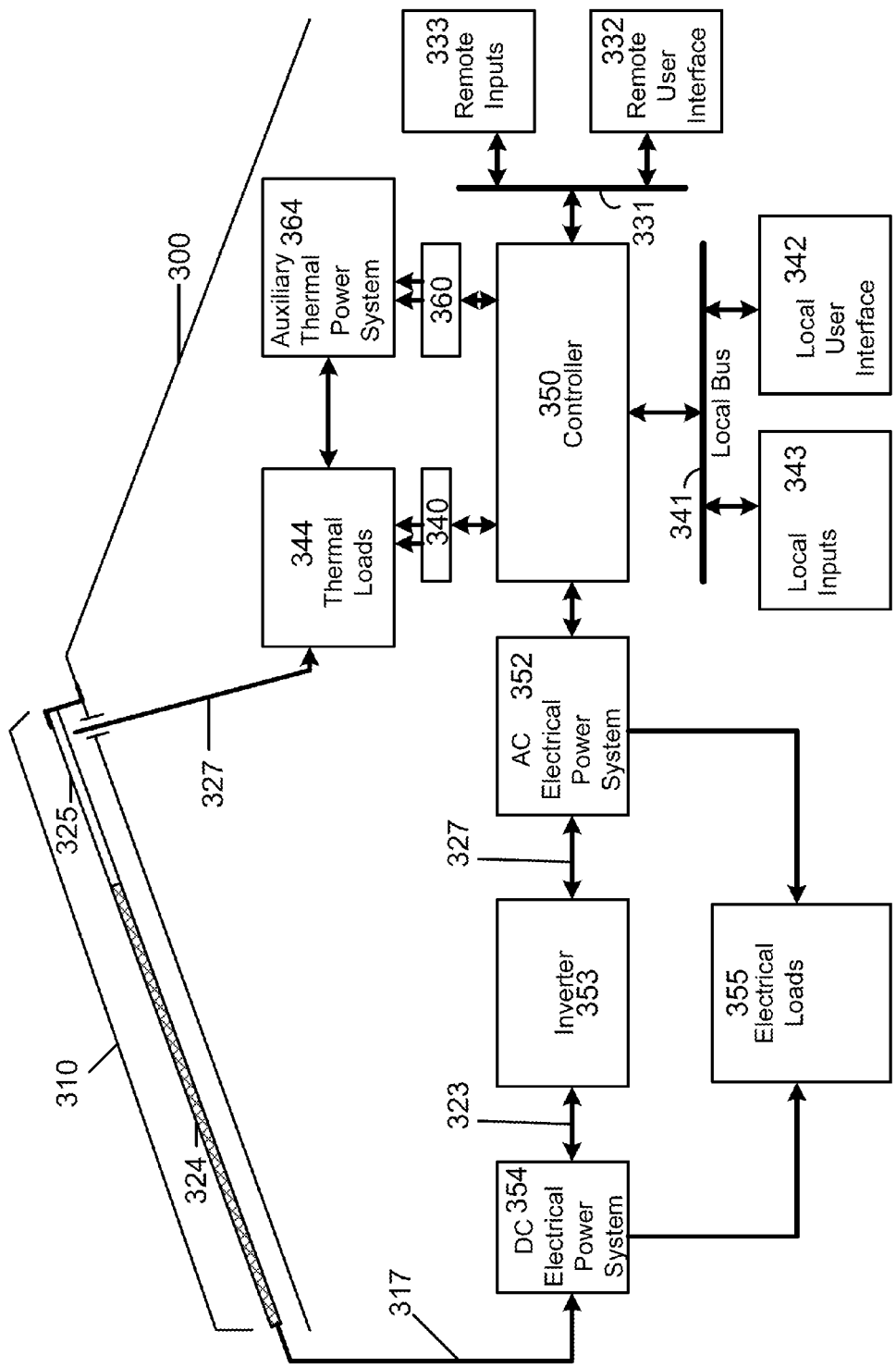
FIG. 3 is a simplified block diagram of a home energy system with space conditioning zone control according to an embodiment of the present invention.

FIG. 3 is a simplified block diagram of a home energy system with space conditioning zone control according to an embodiment of the present invention. This diagram is merely an example, which should not unduly limit the scope of the claims herein. One of ordinary skill in the art would recognize other variations, modifications, and alternatives. As shown, the system includes a control module or a master controller 350 and a first set of control equipments 340 which combine to manage distribution and use of thermal energy output from a solar energy system 310 to any one or more thermal loads 344. The first set of control equipments 340 includes hardware, firmware and/or software that are controllable by the controller 350. In a specific embodiment, the control equipments 340 include (i) equipment (e.g. a blower) that causes airflows from a plenum 112 under solar energy system 110 into ETM 120 or 220, (ii) sensors, including temperature sensors, for reading information about incoming airflow 327 or information about flow downstream in usage by the ETM, (iii) heat exchangers, and (iv) air dampers and other equipment for directing airflow out of the ETM 120 or 220. Alternatively, the controller 350 can be configured to communicate with a module controller installed directly in an electrical-box in the ETM and to let the module controller to execute specific control operation of the equipments 340 as mentioned. Additionally, the master controller 350 may be configured to interface with electric power systems, thermal components, user data, and a wide range of inputs within the system and the target location of the solar energy system 310.

In an embodiment, the solar energy system 310 produces electrical power 317 from PV modules 324 which is fed into the DC Electrical Power System 354. The DC electrical power system 354 outputs DC power 323, which may then be fed either directly into electrical loads 355 that can operate on DC power, or to an alternating current inverter 353. The inverter 353 may convert DC power 323 to AC power 327. The AC power 327 may be supplied to the AC electrical power system 352. The AC power 327 may then be fed either directly into electrical loads 355 that can operate on AC power, or back onto the utility grid. The DC electrical power system 354, Inverter 353, and AC electrical power system 352 may be interfaced with the Controller 350. Depending on the inverter capability, information regarding both DC 354 and AC 352 electrical power systems may be queried by the controller 350 from the inverter 353. Alternately, transducers may be placed on the DC electrical power system 354 or AC electrical power system 352 to determine electrical production from the system 310, or consumption from the various electrical loads 355.

The master controller 350 also interfaces via the first set control equipments 340 to the thermal loads 344 including heating, cooling, water heating, ventilation systems and via a second set of control equipments 360 to auxiliary thermal power systems 364 such as boilers, furnaces, air conditioners, heating elements, and other devices that can supply the thermal loads 344 in tandem with the solar thermal system 310. The second set of control equipments include (i) equipment (e.g. a fan) that causes return airflows from an indoor spatial zone of the building 300 into AHU 130 or 230, (ii) thermostats including built-in temperature and humidity sensors, for obtaining temperature information about the indoor air condition or mode settings information about how to process the return airflow and produce conditioned flow, (iii) heat exchangers or air-condensers, and (iv) air dampers and other equipment for directing the conditioned airflow via multiple outlets coupled to multiple spatial zones of the building. In a specific embodiment, the second set of control equipments also includes a zone controller coupled between one or more thermostat devices and the other control equipments as mentioned to execute specific control operations of the auxiliary thermal system 360. For example, the zone controller is configured to execute control commands received from one or more thermostat devices to operate an air conditioning module or a furnace module to provide space conditioning zone control for multiple spatial zones of the building structure.

The system controller or the master controller 350 is configured to receive data inputs through a local bus 341. Local inputs 343 may include, for example, humidity, temperature, flow rates, occupancy of the structure, electrical demand, and other information of a nature local to the structure that can assist in the ability to optimize the solar energy system 310 performances and load management through appropriate control strategies. The system may also have a local user interface 342 for direct communication with the controller 350 or interfaced devices such as the inverter 353, electrical power systems 352 and 354 as well as thermal control equipments 340 and 360.

A remote data bus 331 enables communication of all remote inputs 333 and remote user interface 332 through any remote communication protocol. Examples of the remote communication protocol include wired and wireless Ethernet, mobile phone networks, satellite, and other communication protocols. A local data bus 341 provides the communication path for local inputs 343 and user interface 342 to the controller 350 and between devices. It may be possible that both the remote and local bus 331, and 341 use the same communication protocols. Either bus 331 or 341 may consist of one or more protocols operating in tandem to establish communications with separate devices. In an embodiment, a thermostat device can include a wireless communication device enabled with a local input or a remote input via a wireless communication protocol shared with the system controller 350 for data I/O between them. For example, a Zigbee wireless communication network can be established between the system controller 350 and one or more thermostat devices with an enabled wireless communication mode.

According to an embodiment, a dedicated remote input 332 may be provided for the remote bus 331 to enable access to information such as weather data or tariff rates of utilities. The remote inputs 333 may include an automated and programmatic mechanism to provide such information to the system controller 350 along with other relevant information.

Still further, one or more embodiments provide for other types of data to be accessed or provided to the system controller 350 through the remote user interface 332. The remote user interface 332 may allow the user to enter data or parameters into the system controller or other devices in communication with the controller 350. For example, the remote user interface 332 may include a virtual thermostat interface from which the user can input a set of setpoints for multiple thermostat devices and enable any of them based on specific requirement of space conditioning zone control within the home energy system. In a specific embodiment, the virtual thermostat interface is configured for remotely setting temperature setpoints and modes of operation for each thermostat device based on one or more operation programs selected from a daily period program, a weekly schedule program, and/or an occupancy program of each of the one or more spatial zones.

According to a specific embodiment, a thermostat device is disposed in a spatial zone as a control equipment of an air conditioner to provide space conditioning zone control for the corresponding spatial zone. The thermostat is configured to have at least two modes of operation, one with local input functionality and one with remote input functionality. The local input allows user to use a touch screen display (i.e., a local user interface) to program operation mode settings based on an automatic mechanism or perform on-site setpoint inputs. The remote input allows the thermostat device to communicate with the system controller 350 and further allows user to program mode settings for the thermostat device via the virtual thermostat interface within the remote interface 332 from anywhere in the world.

Figure 4A:
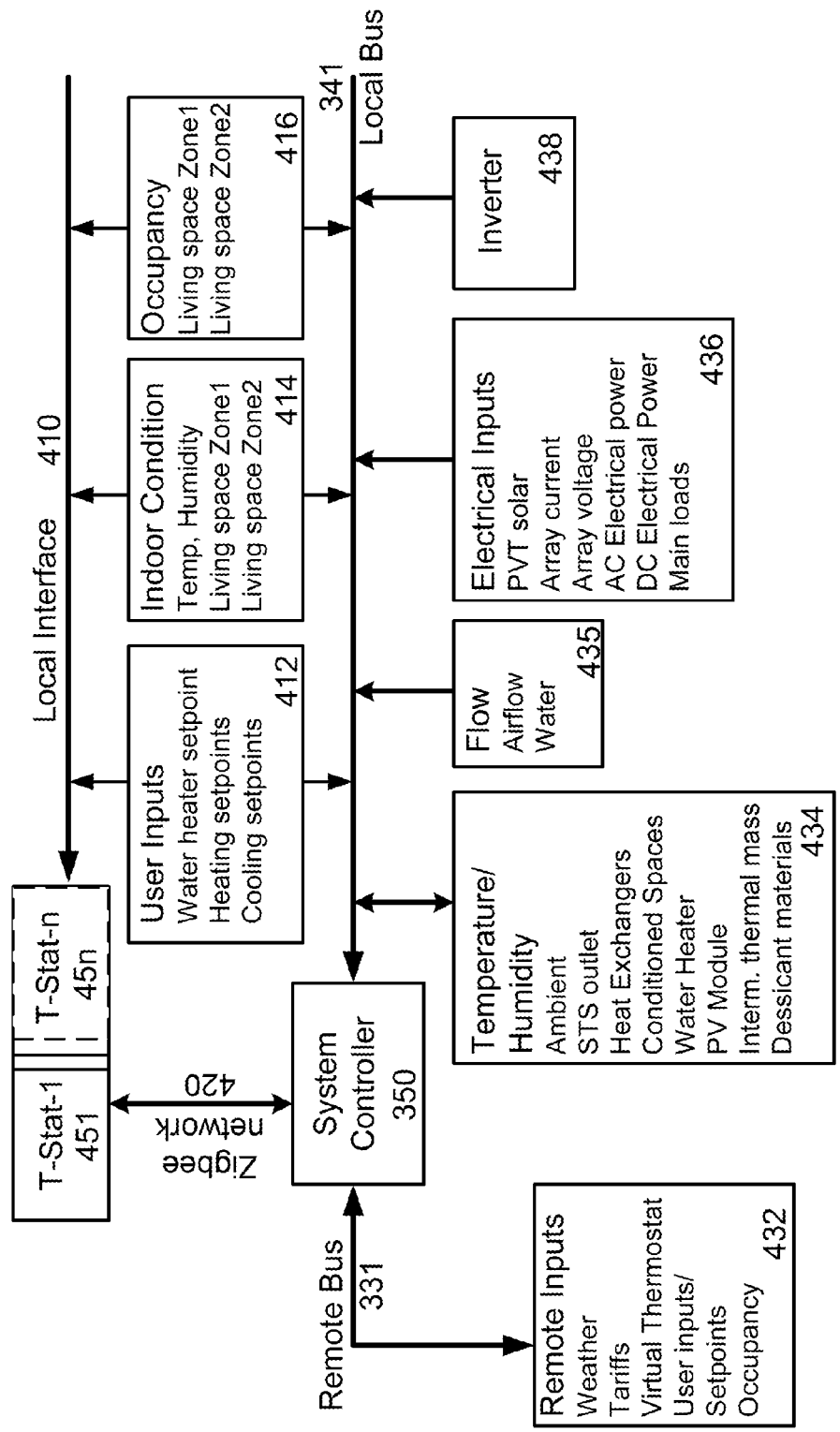
FIG. 4A is a simplified input block diagram of a system controller with multiple thermostat devices for space conditioning zone control according to one or more embodiments of the present invention.

FIG. 4A is a simplified input block diagram of a system controller with multiple thermostat devices for space conditioning zone control according to one or more embodiments of the present invention. This diagram is merely an example, which should not unduly limit the scope of the claims herein. One of ordinary skill in the art would recognize other variations, modifications, and alternatives. With reference to an embodiment of FIG. 3, controller 350 can receive many inputs from a variety of local sensors and through the remote and local busses 331 or 341. The controller 350 has established a wireless network with multiple thermostat devices 451, . . . , 45n for providing space conditioning zone controls for multiple spatial zones of a building structure or home dwelling. Access to system data and information may be relevant to the ability to create control strategies and algorithms that optimize system performance. As described, for the system controller 350 the inputs may be received from the local bus 341 in the form of information, including User Inputs/Setpoints 412, Indoor Condition Inputs 414, Occupancy information 416, Temperature and Humidity information 434, Flow information 435, Electrical Inputs 436, and Inverter data 438. In another embodiment, for the multiple thermostats designated for controlling some auxiliary thermal power system to provide space conditioning, the inputs are needed to be received via a local interface 410 in the form of following information including at least partially User Inputs/Setpoints 412, Indoor Condition Inputs 414, Occupancy information 416. In a specific embodiment, the local interface 410 is a touch screen display built in each thermostat device 451. In another embodiment, controller 350 is configured to receive User Inputs/Setpoints 412 through either the local user interface associated with the local bus 341 or the remote user interface associated with the remote bus 331. Examples of User Inputs/Setpoints 412 may include water heater setpoint, heating and cooling setpoints for space heating or space cooling via a furnace module or an air conditioning module, and other operational setpoints. The remote user interface may include a virtual thermostat that allows user to input or program mode settings for operate the control elements designated for any of the thermostats 451 . . . 45n which are applied respectively for providing space conditioning zone control.

Indoor Condition Inputs 414 include at least an indoor temperature detected by an independent RTD temperature sensor in each of living space zones that needs space air conditioned or measured by a built-in temperature sensor of each thermostat disposed in corresponding zones. Humidity input associated each separate indoor living space zone may be provided.

Occupancy information 416 may be automatically sensed by ultrasonic or infrared sensors typically used in motion detectors. The structure can be divided into zones and occupancy can be reported to the controller by zone. As an alternative or addition, occupancy information 416 may be inferred from, for example, usage of appliances through a monitoring of electrical loads 355. In another alternative implementation, the occupancy information is further referred from a programmed calendar settings about the usage of particular living space in terms of at-home, sleep, or away status that are applied through remote inputs 432.

Temperature and Humidity Input 434 may be provided through sensors that are positioned to detect temperature and humidity from, for example, ambient air, the conditioned space, and/or airstreams within the systems that may include thermal storage, heat exchangers, PV modules in operation, air condenser, desiccant materials or heat recovery systems. One or more embodiments provide that the temperature information may be provided by measurements that are made for a determined optimal operation of the system. In one or more embodiments with references of FIG. 1 and FIG. 2, the temperature information 434 includes, for example, the reporting of ambient air temperature outside the building 100, solar array 110 output temperature, the temperature after airflow through a heat exchanger in energy transfer module 120/220, air temperature in conditioned indoor space 101/102 measured by a thermostat 150/151/152 or a RTD temperature sensor 190, temperatures in a water heater (not shown), output temperatures of conditioned airflow from AHU 130/230, and other temperature measurements as may be required by the system.

Flow information (and/or inputs) 435 may include information that identifies or indicates the volume of air flowing through a particular outlet or section of either the solar thermal module 110, energy transfer module 120, or air handler unit 130, and the flow of air in hydronic loops. Flow information 435 may be in various forms, such as in the form of actual mass or volumetric flows, and/or in the form of simple on/off indicators as to whether flow exists or not.

Electrical inputs 436 include, for example referred to FIG. 3, current and voltage provided by the PV modules 324, outputs from DC electrical power system 354, outputs from AC electrical power system 352, the main meter for the building structure, and the load demand for individual or multiple sub loads 355. Examples of sub loads 355 include air conditioners, furnaces, pool pumps, lighting, water heaters and/or anything with electrical power consumption to be metered.

The controller 350 may also interface with the inverter 353 to obtain operating information 438 regarding the electrical performance of the inverter, the current and voltage characteristics of PV modules 224 connected to the inverter 353, and the export of power from the inverter 353 to the AC electrical power system 352.

In addition, the controller 350 can receive data from remote inputs 432. The data from remote inputs may include, for example, weather data, energy pricing, and tariff schedules from the utility for energy. The data may also include, specifically for each of the multiple thermostats that form wireless communication network with the system controller 350, mode settings for each thermostat. These and other data sets may be provided via a user interface to the controller 350 over the remote bus 331, user inputs 412, or potentially the local bus 341. The user interface is configured to connect a server that connects to Internet through world wide networks of computers, allowing a user to access and input control data from anywhere in the world. For example, the control data including mode settings for a particular thermostat 451 can be inputted from the remote user interface and then provided to the controller 350 via the remote bus 331. The thermostat 451 further can receive the mode settings through the Zigbee wireless network 420 from the controller 350.

Figure 4B:
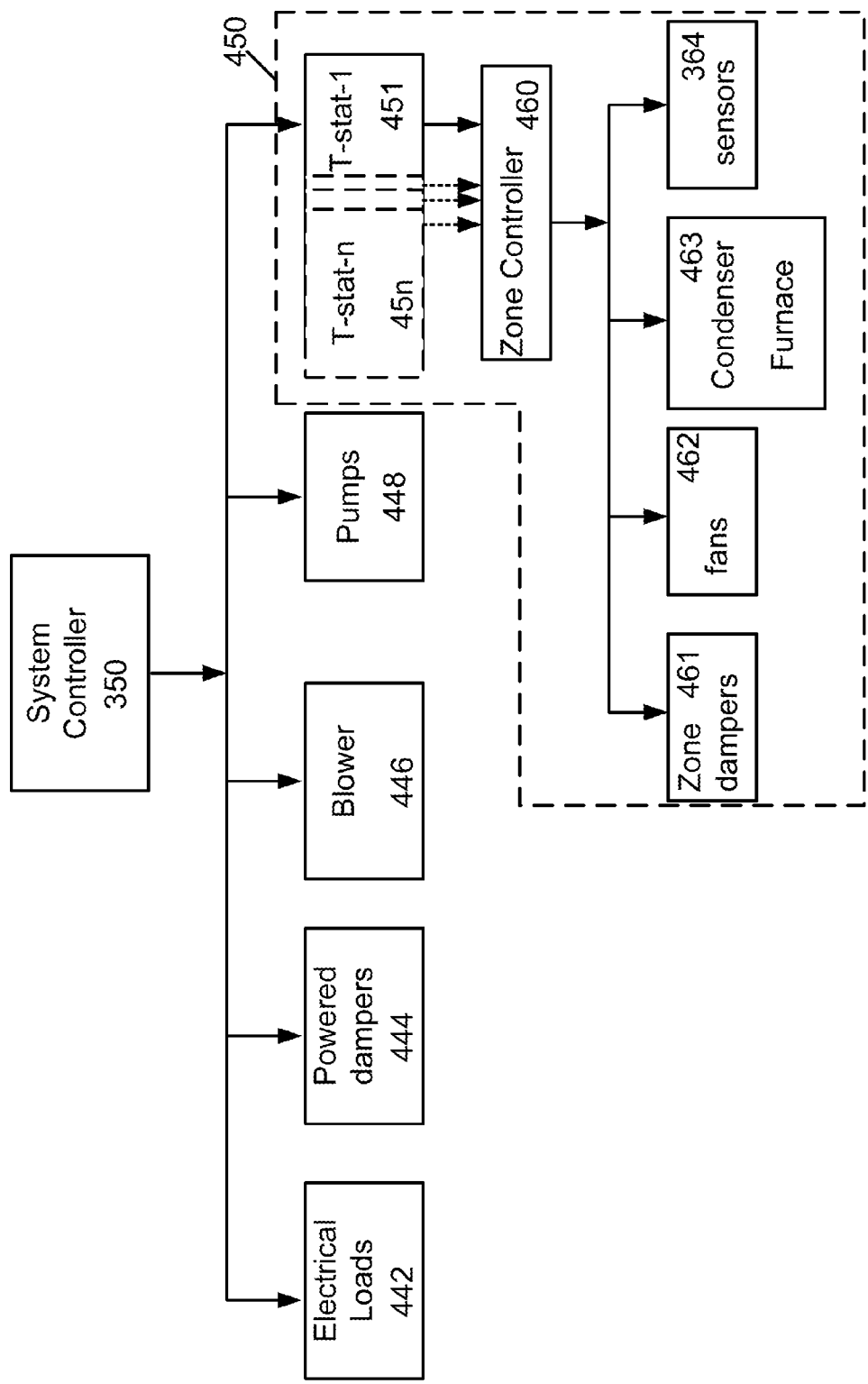
FIG. 4B is a simplified output block diagram of a system controller with multiple thermostat devices for space conditioning zone control according to one or more embodiments of the present invention.

FIG. 4B is a simplified output block diagram of a system controller with multiple thermostat devices for space conditioning zone control according to one or more embodiments of the present invention. This diagram is merely an example, which should not unduly limit the scope of the claims herein. One of ordinary skill in the art would recognize other variations, modifications, and alternatives. In an embodiment, the outputs associated with the system controller and the multiple thermostats are control equipments for use as part of the whole healthy home system for performing optimization operations. The physical elements may not only optimize power generation of the solar thermal system 310 (FIG. 3) through output components like powered dampers 444, blower 446, and pumps 448, but also facilitate or enable control and regulation of any electrical loads 442 or components of the auxiliary thermal power systems 450.

In a specific embodiment, controller 350 is connected to regulate or modulate any of the electrical loads 442 connected to the DC electrical power system 354 (FIG. 3) or AC electrical power system 352 (FIG. 3), as indicated by output block 442. The controller 350 may also operate any combination of blowers 446 and dampers 444 to drive and direct airstreams to transfer thermal energy. Operation of pumps through output block 448 is also possible. Control over auxiliary thermal power systems 450 is also possible and allows coordination of generation from the system 310 (FIG. 3) and these backup energy systems. Additional output blocks may be provided as necessary for the controller 350 to interface with and influence any system components that may impact the generation or use of energy within the structure.

In another specific embodiment, as an example of operating the auxiliary thermal power system 450, the system controller 350 is configured to use or communicate with multiple thermostats 451 through 45n for providing space conditioning zone control by operating an air conditioner with multiple outlets coupled to the corresponding multiple spatial zones. As shown, the multiple thermostats 451 ... 45n are a first level output components which also a drive second level output component 460. In an embodiment, the second level output component 460 is an air conditioner (or a furnace) configured to produce a conditioned (cooled or heated) airflow. The second level output component 460 operates the air conditioner having multiple outlets connected to multiple spatial zones to regulate or modulate a distribution of the conditioned airflow partially through each of the multiple outlets into the corresponding one of the multiple spatial zones. In another embodiment, the second level output component 460 is a zone controller which couples all the thermostats to receive the preset control mode settings and executes respectively the mode settings from each thermostat to drive several third level output components that are direct control elements for operating the air conditioner to process the airflow and modulate the conditioned airflow. For example, the third level output components include multiple zone dampers 461 disposed respectively in the multiple outlets of the air handler unit 230 (FIG. 2), a fan 462 in the air handler unit for move the airflow, an air condenser or a furnace heater 463 for processing the airflow with phase change and/or heat exchange, and one or more sensors for monitoring the air processing and flow output.

Further details of the present hardware and software are provided below. The hardware and software together is configured to integrate space conditioning zone control with overall healthy home energy management according to one or more embodiments. The controller hardware is also configured for expansion to integrate lighting and other home energy loads as well as home automation and security systems as examples. In a specific embodiment, the hardware interfaces are required to incorporate industry standard multidrop communication bus structures such as RS-485 Mode bus and CAN bus for local field bus communication to other home control devices. The software is therefore capable of integrating other sub-system data within its architecture. Of course, there can be other variations, modifications, and alternatives.

In a specific embodiment, the hardware configuration for the controller includes a CPU/communications board and a connected daughterboard for all external connections except the Ethernet cable, USB Ports, and SD card. The CPU board uses the Debian Linux operating system with a JFS file system. In addition, the daughterboard incorporates signal conditioning circuitry that switches sensor inputs with an analog multiplexer. Hardware sensor interfaces have also been added and motor control will be done directly from this controller rather than sending an analog control signal to a separate motor control board.

The software approach is configured to allow the users to have an access to the system's performance data and its control settings from remote locations. In order to provide this functionality and the most flexible path for future business development in the ever changing world of renewable energy credits and performance monitoring of solar systems, the present system includes an enterprise architecture for its solar system controller. This approach will also allow the user to access/update data from/into the controller using a web-based application. Of course, there can be other variations, modifications, and alternatives.

In a preferred embodiment, the controller is configured in a clean production implementation that can easily be mounted in an enclosure with no external cabling or motor control boards. The controller includes features noted throughout the present specification as also includes the CPU module and Linux operating system. In one or more embodiments, the controller also includes additional communication capability using RS-485 multi-drop channels desirable for future expansion of the system for inverters, HVAC systems, lighting, and general home automation. For instance, the controller uses a RS-485 port to communicate to two power monitoring devices, one for home power consumption, the second for PV array production. Inverters can also be interfaced directly using a 485 port or other communication port(s). Multiple RS-485 multi-drop channels are provided for different end devices (e.g. thermostat, inverter) utilizing the bus protocol differently and not being interoperable on a single channel. In one or more embodiments, three RS-485 communication ports are included in the controller along with a CAN bus channel. The additional communication capability allows the controller to interface with multiple disparate systems to extend the 10 capabilities. Other variations can also exist.

The CPU module is configured to handle communication, motor control logic (triac firing angle and PWM), and A/D conversion of analog signals, among others. It will plug into an interface daughterboard, which contains the connectors for RS-485 ports, RS-232 port, and CAN bus. In a specific embodiment, the incorporation of triac drivers on board eliminates the existing remote Nimbus SmartFan motor control board and further reduces cost and wiring complexity. In a specific embodiment, the daughterboard also contains multiplexing and signal conditioning for analog inputs such as RTD temperature sensors and outputs such as triacs to drive blowers and pumps. By using a custom CPU board that plugs into a daughterboard, the core of the software development is ported easily to the new hardware platform. Further details of the controller hardware are provided below:

CPU Board:
- 200 MHz ARM9 CPU
- Debian V2.6 Linux Operating System on SD Card with JFS Filesystem
- Ethernet Port
- 2 USB ports
  These ports can be used to expand communication functionality through USB devices such as IEEE 802.11 (Wi-Fi), IEEE 802.15.4 (e.g. ZigBee), and class 1 Bluetooth at low incremental cost and avoids the necessity of placing all radios on the dedicated boards when they may not be needed. The USB ports can be populated by those radios required by the installation.
  The USB port can also be used to transfer data and software updates to & from the controller in instances when the network does not exist or the controller has lost communication capability.
- 1 CANbus Port
  The CANbus is an internal standard fieldbus for the present system according to a preferred embodiment. Although the hardware brings all I/O to the controller, other applications may use remote I/O modules that communicate with the central controller using CAN.
- 1 SPI Port
  The SPI port is brought through the header connection to the daughterboard for control of A/D conversion.
- 3 Multi-Drop RS-485 Ports
  Allows extended I/O and interface to ancillary systems
- 1 RS-232 Port It is also understood that the examples and embodiments described herein are for illustrative purposes only and that various modifications or changes in light thereof will be suggested to persons skilled in the art and are to be included within the spirit and purview of this application and scope of the appended claims. Further details of a specific technique for monitoring and verifying a solar thermal system can be found throughout the present specification and more particularly below.

It is also understood that the examples and embodiments described herein are for illustrative purposes only and that various modifications or changes in light thereof will be suggested to persons skilled in the art and are to be included within the spirit and purview of this application and scope of the appended claims. Further details of a specific technique for monitoring and verifying a solar thermal system can be found throughout the present specification and more particularly below.

Figure 5:
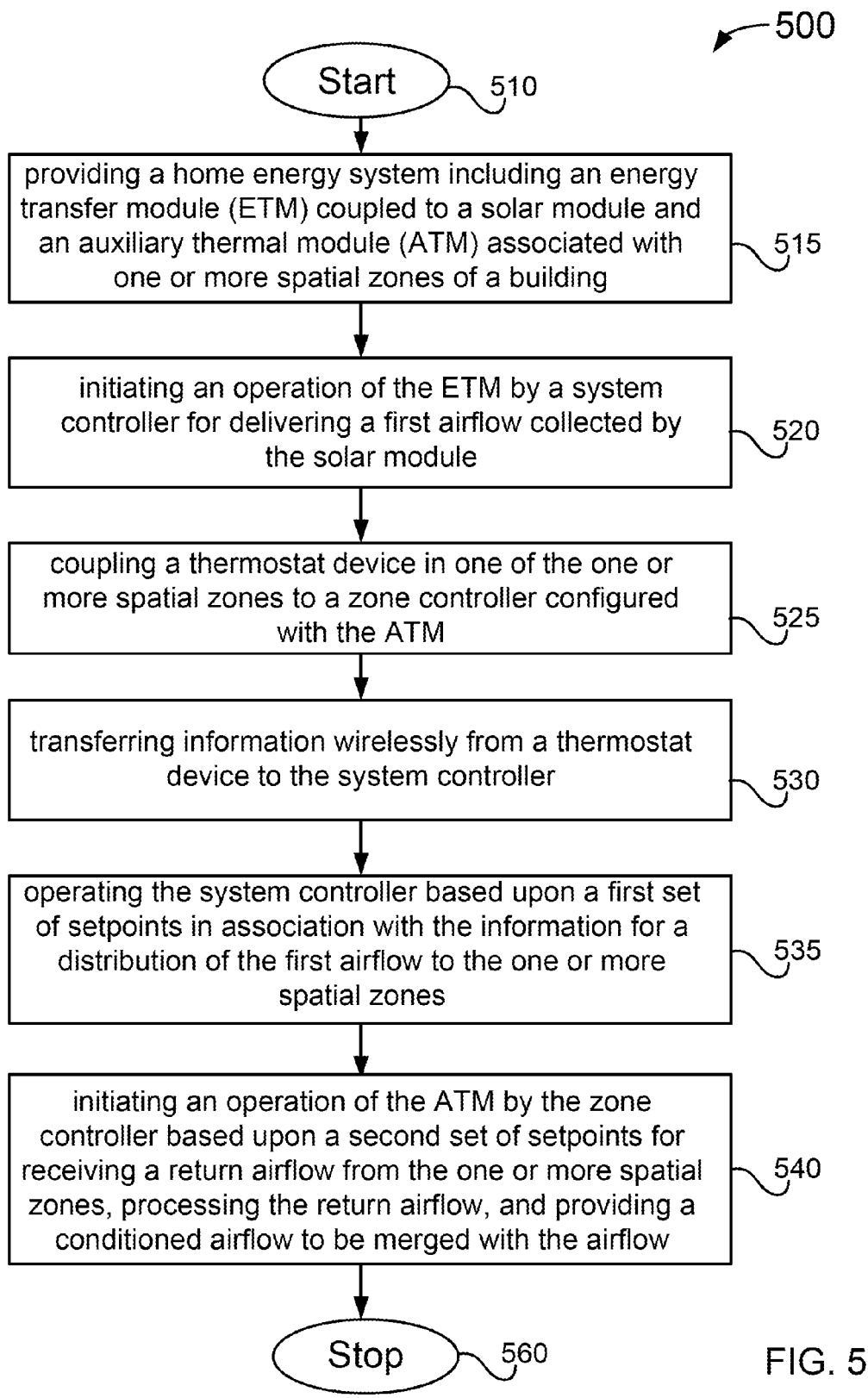
FIG. 5 is a simplified flow diagram illustrating a method for providing space conditioning zone control within a home energy system according to an embodiment of the present invention.

FIG. 5 is a simplified flow diagram illustrating a method for providing space conditioning zone control within a home energy system according to an embodiment of the present invention. This diagram is merely an example, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

As shown in FIG. 5, the present method 500 can be briefly outlined below.

1. Start;
2. Provide a home energy system including an energy transfer module (ETM) coupled to a solar module and an auxiliary thermal module (ATM) associated with one or more spatial zones of a building;
3. Initiate an operation of the ETM by a system controller for delivering an airflow collected by the solar module;
4. Couple a thermostat device in one of the one or more spatial zones to a zone controller configured with the ATM;
5. Transfer information wirelessly from each thermostat device to the system controller;
6. Operate the system controller based upon a first set of setpoints in association with the information for a distribution of the airflow to the spatial zone;
7. Initiate an operation of the ATM by the zone controller based upon a second set of setpoints for receiving a return airflow from the spatial zone, processing the return airflow, and providing a conditioned airflow to be merged with the airflow; and
8. Stop.

These steps are merely examples and should not unduly limit the scope of the claims herein. As shown, the above method provides a way of providing zone control in space conditioning operation within a home energy system according to an embodiment of the present invention. In a preferred embodiment, the method uses a system controller configured to establish a dedicated wireless communication with multiple thermostat devices coupled to a zone controller to coordinate operations of an energy transfer module and auxiliary thermal module so that the solar thermal energy is efficiently used and energy resources are substantially saved for providing space conditioning operation to multiple spatial zones of a building structure. One of ordinary skill in the art would recognize many other variations, modifications, and alternatives. For example, various steps outlined above may be added, removed, modified, rearranged, repeated, and/or overlapped, as contemplated within the scope of the invention.

As shown in FIG. 5, the method 500 begins at start, step 510. The present method provides a method for providing space conditioning zone control in association with an operation of a home energy system utilizing solar thermal energy and conserving energy resources. Zone control for multiple conditioned spaces of a building is achieved by coordinating operations of an energy transfer module and an auxiliary thermal module within the home energy system for efficiently utilizing solar thermal energy and substantially conserving conventional energy resources. Here, the method begins at a home energy system implemented at a target building structure with multiple spatial zones, such as the one noted above, as well as others.

The home energy system configured with the target building structure is provided with an energy transfer module (ETM) coupled to a solar module and an auxiliary thermal module (ATM) for home energy applications (step 515). The solar module (e.g., module 310 in FIG. 3) includes a photovoltaic PV panel for producing DC electrical power (which is converted to AC power and mixed into grid) and/or a thermal panel for merely converting sun power to thermal energy. The PV panel also releases thermal energy during its operation. Using a plenum structure set underneath the solar module, a flow of air can be collected from ambient region to carry the thermal energy generated by the solar module. In one or more embodiments, the building structure has one or more spatial zones including at least a first spatial zone and a second spatial zone. The collected airflow by the plenum structure is guided into the ETM 220 (FIG. 2) through a duct or gas inlet. The ETM 220 (FIG. 2) includes several functional elements to process the airflow for utilizing the thermal energy from the solar module. For example, the ETM includes a heat exchanger for transferring part of thermal energy for water heating. The ETM also includes a blower to set a flow rate for the airflow and one or more outlets each disposed with an air damper for directing the airflow from the ETM partially into one or more spatial zones of the building structure. The ATM includes an air handler unit AHU 230 (FIG. 2) and an air processing (heating/cooling) unit 234 (FIG. 2). In an implementation of the present invention, the air processing unit is an air conditioner for providing cooled airflow for a spatial zone or a furnace module for providing heated airflow for the spatial zone. Of course, there can be other variations, modifications, and alternatives.

The home energy system further includes a system controller configured to initiate operation of the ETM to deliver an airflow collected from the solar module (step 520). The system controller includes specific I/O devices to direct couple with a module controller installed the ETM for executing operation commands through one or more control elements, like the blower in ETM and air dampers in the one or more outlets, for modulating the airflow in terms of flow rate, volume, static pressure, and temperature (as well as the thermal energy distributed).

The system further includes at least a first thermostat device disposed in a first spatial zone of the one or more spatial zones and a second thermostat device disposed in a second spatial zone of the one or more spatial zones (step 525). Each of these thermostat devices is configured to couple with a zone controller configured to control an operation of the ATM. In a conventional implementation, the ATM provides a cooled airflow for a spatial zone when the ATM is operated in a cooling mode as set by a thermostat device disposed in the particular spatial zone, or provides a heated airflow for the spatial zone when the ATM is operated in a heating mode as set by the thermostat device. According to embodiments of the present invention, the zone controller directly couples to all thermostat devices disposed in the one or more spatial zones and receives information from each thermostat device about the indoor temperature therein and modes of operation set for the thermostat device. Based on the information, the zone controller is configured to control the operation of the ATM for processing return airflow from at least one spatial zone and generating a conditioned airflow for each spatial zone that needs space conditioning. In certain embodiments, the zone controller is built inside the ATM and wirely coupled to the thermostat devices. Of course, there can be other variations, modifications, and alternatives.

In an embodiment, the method 500 further includes a step 530 for transferring information wirelessly from each thermostat device to the system controller. The information may include an indoor temperature measured by the thermostat device in a particular spatial zone and modes of operation currently set in the thermostat device. In a specific embodiment, the thermostat device includes a wireless communication device having a Zigbee radio transceiver configured to mate with another Zigbee USB stick plugged in an I/O port of the system controller. Through a few configuration processes, a dedicated Zigbee local wireless network between the system controller and each thermostat device is established, allowing the wireless communication between them. The communication is a two-way transmission so that the system controller is also able to transfer different sets of data back to each thermostat device or provide a channel for user to remotely access each thermostat device from the system controller via a user interface.

Further, the method 500 includes a step 535 for operating the system controller based upon a first set of setpoints in association with the information transferred from each thermostat device for a distribution of the airflow from ETM to the one or more spatial zones. The system controller determines a heating or cooling mode of operating the ETM based upon a first set of setpoints. In an embodiment, the first set of set points includes at least a first cooling setpoint for the cooling mode and a first heating setpoint for the heating mode of ETM operation. When a building temperature increases above the first cooling setpoint the system controller initiates an operation of ETM in cooling mode to supply airflow that is cooled by radiation effect via the solar panels. When the building temperature falls below the first heating setpoint the system controller initiates another ETM operation in heating mode to deliver the airflow carrying thermal energy generated by the solar module in active operation period. The control operation of the ETM relies on information received by the system controller about air temperature from ambient region, solar module operation status, air pressure before and after the blower, and humidity measured by multiple temperature/pressure/humidity sensors and/or information of current indoor temperature and setpoint associated with the thermostat devices in one or more target spatial zones. The multiple temperature/pressure/humidity sensors can be configured within various regions associated with the solar module, the energy transfer module, and inlet/outlet duct lines. In an embodiment, the system controller initiates an operation of ETM for delivering a first airflow into a spatial zone based on one setpoint associated with the same spatial zone. Depending on the first set of setpoints respectively associated with multiple spatial zones, the system controller operates the ETM to control the distribution of the first airflow to one or more of the multiple spatial zones either for providing space heating or space cooling, where the first airflow carries out merely solar thermal energy substantially without spending conventional energy resources.

The method further includes one or more steps (540) for initiating an operation of the ATM by the zone controller based upon a second set of setpoints for receiving a return airflow from the one or more spatial zones, processing the return airflow, and providing a conditioned airflow to be merged with the airflow from ETM. According to embodiments of the present invention, the zone controller receives information directly from all thermostat devices disposed in all the spatial zones at least about the indoor temperature in each zone and modes of operation set for each thermostat device. Based on the information, the zone controller determines a second set of setpoints that are used for controlling the operation of the ATM for processing return airflow from at least one spatial zone and generating a conditioned airflow for each spatial zone that needs space conditioning. The ATM includes an air handler unit and an air processing (heating/cooling) unit. The air handler unit is configured to receive a return airflow from at least one of the multiple spatial zones. In an implementation, the air processing unit includes an air conditioner for providing the cooled airflow to the particular spatial zone when the ATM is operated in a cooling mode as set by the thermostat device disposed in corresponding spatial zone. The air processing unit also includes a furnace module for providing the heated airflow for the spatial zone when the ATM is operated in a heating mode as set by the thermostat device.

In an embodiment, the ATM operation controlled by the zone controller based upon the second set of setpoints that is coordinated or correlated with the first set of setpoints associated with the ETM operation control. In a specific embodiment, the second set of setpoints include at least a second cooling setpoint per a specific zone determined for operating the ATM in a cooling mode and a second heating setpoint per the same zone for ATM operation in a heating mode. The second cooling setpoint is designated to be set higher than the first cooling setpoint and the second heating setpoint is set to be lower than the first heating setpoint. Accordingly, the first cooling setpoint and the second cooling setpoint are respectively assigned to be a lower bound and an upper bound of a first comfort band for the particular spatial zone. Assuming in a cooling season, when indoor temperature falls within the first comfort band, the home energy system uses the system controller to only initiate an ETM operation based on the first cooling setpoint to deliver cooled airflows from the solar module to the target spatial zone. Only when the indoor temperature surpasses the second cooling setpoint (e.g., out of the first comfort band), does the home energy system uses the zone controller to initiate additional ATM operation based on the second cooling setpoint to provide conditioned airflows optionally merging with the airflows from ETM before being delivered to the target spatial zone.

Similarly in a heating season, the ETM operation by the system controller based on the first heating setpoint is initiated before the ATM operation by the zone controller based on the second heating setpoint that is lower than the first setpoint. Accordingly, a second comfort band bound between the second heating setpoint is assigned to the home energy system in heating mode. Only when the indoor temperature falls out of the second comfort band, does the ATM start to provide additional heated airflow to merge with a first airflow carrying thermal energy from the solar module to form a second airflow being distributed to one or more target spatial zones for space conditioning. Of course, there can be other variations, modifications, and alternatives. For example, the first comfort band and the second comfort band are programmable depending on a daily period program, a weekly schedule program, and an occupancy program designated for each of the one or more spatial zones.

The number of control elements for operating the auxiliary thermal module includes, at least, a fan in the AHU for collecting return airflow and move the conditioned airflow, a powered damper in each of the multiple outlets for distributing the conditioned airflow, air condenser or desiccant wheels in ACU for processing the airflow, heater in furnace module, and various sensors for monitoring the airflow. The zone controller is configured to transfer corresponding control commands to operate each of the number of control elements to regulate or modulate the conditioned airflow and further modulate the distribution of the second airflow (after partially merging with the first airflow from the ETM) into corresponding one or more target spatial zones.

The home energy system not only is configured to couple hardware ETM together with the AHU but also is configured to allow the system controller for controlling the ETM to establish a dedicate communication channel with the one or more thermostat devices indirectly transfer control settings to the zone controller for controlling the AHU, thereby achieving an operation coordination between the ETM (and solar module) utilizing solar thermal energy and the ATM spending conventional energy resources. The system controller is configured to receive information about the indoor temperature measured and stored in each thermostat and information about mode settings of each thermostat. Each of the one or more thermostats is enabled with a simple mode configured to send Zigbee radio signals for mating with a USB stick on the system controller to establish a point-to-point network. Then the corresponding information can be sent from each thermostat to the system controller. The system controller thus can use the information to replicate its control over the ETM and energy production in solar thermal system. In particular, the electrical and thermal power generations are monitored and adjusted based on the inputs from the system controller. Further, the thermal energy transfer in ETM is adjusted in terms of regulating heat exchange for water heating and airflow distribution for space heating/cooling. In a specific embodiment, the system controller can use a user interface to transfer operation commands and update mode settings back to the one or more thermostat devices within a certain time period. Therefore, the space conditioning in each target spatial zone can be controlled within a systematic optimization scheme.

The above sequence of processes can be stopped at step 560 for providing space conditioning zone control within a healthy home energy system according to an embodiment of the present invention. As shown, the method uses a combination of steps including operating both an energy transfer module and an auxiliary thermal module, communicating system controller to one or more thermostat devices via a dedicatedly local wireless network, performing coordinated space conditioning using ETM alone to save energy, and replicating zone control with ETM operation to achieve efficient solar energy use. Other alternatives can also be provided where steps are added, one or more steps are removed, or one or more steps are provided in a different sequence without departing from the scope of the claims herein. Further details of the present method can be found throughout the present specification and more particularly below.

Figure 6:
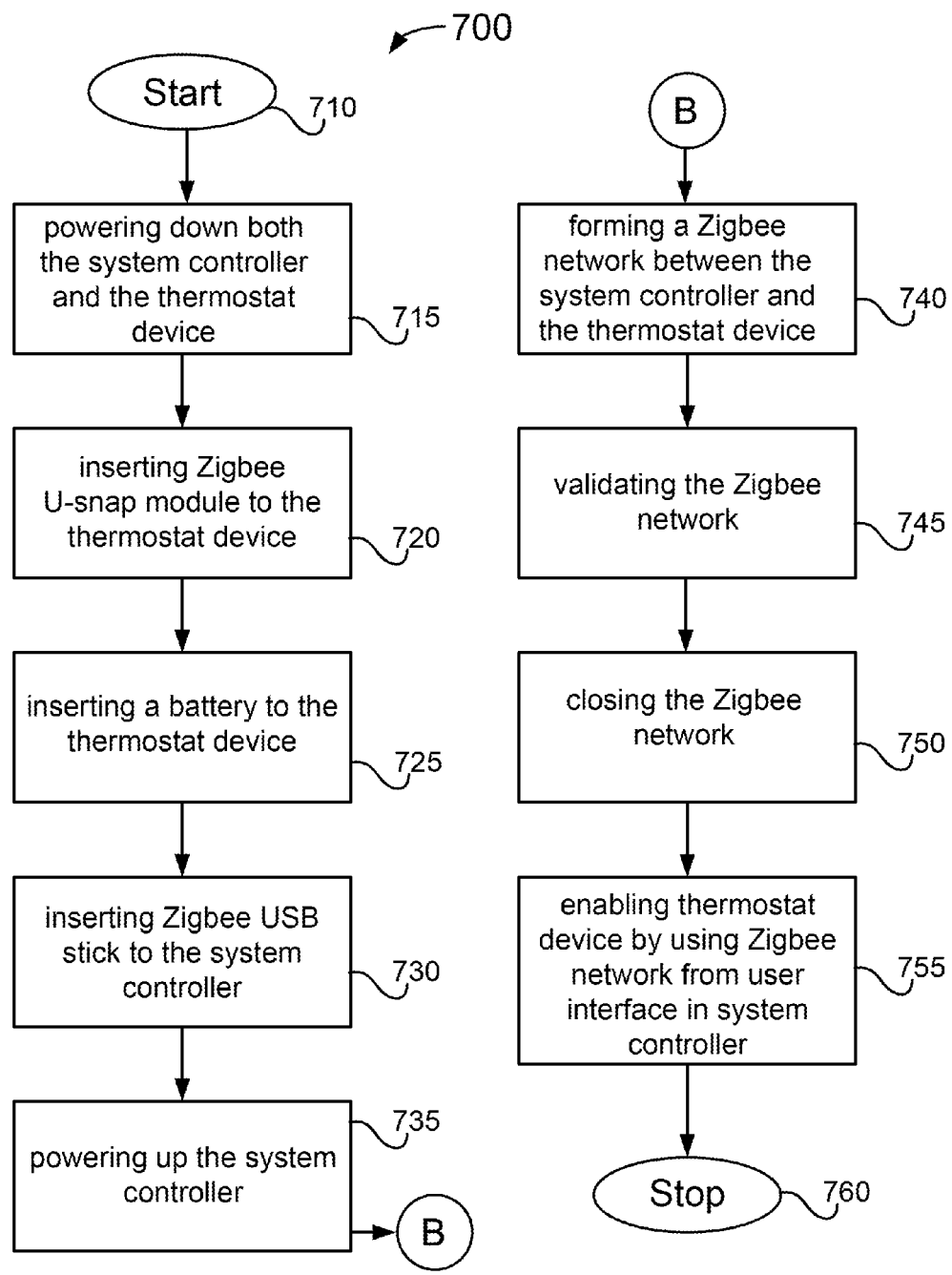
FIG. 6 is a simplified flow diagram illustrating a method for commissioning a thermostat device for providing space conditioning zone control within a healthy home energy system according to an embodiment of the present invention.

FIG. 6 is a simplified flow diagram illustrating a method for commissioning a thermostat device for providing space conditioning zone control within a healthy home energy system according to an embodiment of the present invention. This diagram is merely an example, which should not unduly limit the scope of the claims herein. One of ordinary skill in the art would recognize other variations, modifications, and alternatives. It is also understood that the example and embodiments described herein are for illustrative purposes only and that various modifications or changes in light thereof will be suggested to persons skilled in the art and are to be included within the spirit and purview of this process and scope of the appended claims.

As shown in FIG. 6, the present method 700 can be briefly outlined below.
1. Start;
2. Power down both the system controller and the thermostat device;

3. Insert Zigbee U-snap module to the thermostat device;
4. Insert a battery to the thermostat device;
5. Insert Zigbee USB stick to the system controller;
6. Power up the system controller;
7. Form a Zigbee network between the system controller and the thermostat device;
8. Validate the Zigbee network;
9. Close the Zigbee network;
10. Enable thermostat device by using Zigbee network from user interface in system controller; and
11. Stop These steps are merely examples and should not unduly limit the scope of the claims herein. As shown, the above method 700 provides a way of establishing a communication network between the system controller and any one of the one or more thermostat devices disposed respectively in multiple target spatial zones according to an embodiment of the present invention. One of ordinary skill in the art would recognize many other variations, modifications, and alternatives. For example, various steps outlined above may be added, removed, modified, rearranged, repeated, and/or overlapped, as contemplated within the scope of the invention.

As shown in FIG. 6, the method 700 begins at start, step 710. The present method provides a commissioning method for establishing a point-to-point local wireless network between a system controller and a thermostat device in the home energy system for providing zone control according to an embodiment of the present invention. Here, the method partially may be executed through a web-page, a personal computer, a computing system, or any system capable of running the healthy home graphical user interface, establishing connection to the home energy system, access stored information about system performance, and receiving user input, such as a mouse, keyboard, touch screen, and others.

The system controller and the identified thermostat device are respectively powered down in order for the initialization of a network mating process between them, step 715.

The method 700 then follows with a step 720 to insert a Zigbee U-snap module into the identified thermostat device. Each of these thermostats has been pre-configured to have at least a mode of operation that is compatible with a wireless communication with other device. In particular, the thermostat device includes an I/O port that allows a Zigbee module to be plugged in.

The method 700 includes a step 725 of inserting a battery into the thermostat device. Optionally, the thermostat device is disposed into a target spatial zone that may have no AC power jack. The thermostat device is by default powered by the battery.

The method 700 includes further a step 730 of inserting a Zigbee USB stick into the system controller. The Zigbee USB stick is inserted into one of the multiple USB ports of the CPU Board of the system controller. The CPU board uses the Debian Linux operating system with a JFS file system. The USB ports are configured to be populated by the Zigbee radio required by the installation for transferring data and software updates to & from the controller in instances when the network does not exist or the controller has lost communication capability.

The method 700 includes further a step 735 of powering up the system controller for initiating a mating process between the Zigbee USB stick in the system controller and the Zigbee U-snap module in the thermostat device.

The method 700 includes a next step 740 of forming a Zigbee network between the system controller and the thermostat device. The step includes sending an identification command from the Zigbee U-snap module to the USB stick using a Transterm protocol. The controller then can recognize the identified thermostat device, then an echo signal may be answered back to the Zigbee module in thermostat device.

The method 700 includes a step 745 of validating the Zigbee network. This step may include sending/receiving test data with predetermined information bytes and security codes between the two Zigbee devices. The data transfer rate, signal strength, and stability needs to be validated based on a predetermined standard.

The method 700 further includes a step 750 of closing the network. In an embodiment, this step means to make the established Zigbee network exclusively to the as-mentioned two devices: the system controller and the identified thermostat device. No rogue devices can be allowed to enter and deform the network.

The method 700 further includes a step 755 of enabling the thermostat device by using the Zigbee network from a user interface in the system controller. In one or more embodiments, a validated user interface can be initialized on any personal computer, computing system, or computing device that can run the user interface program, display the graphical contents, and accept user inputs through an input device, such as a mouse, keyboard, touch screen, smart phone, iPad, and the like. The enabling process is performed under a virtual thermostat interface specifically designated for programming mode settings of an identified thermostat. The virtual thermostat interface includes at least following features, like a temperature setting based on a "Honeywell Dial" iconic thermostat design, single setpoint control, seamless control for all space conditioning systems, comfort band setting to reduce fossil fuel usage and optimize solar heating and night cooling, and a calendar occupancy scheduler. One skilled in the art would recognize many other variations, modifications, and alternatives.

The above sequence of processes provides a method for commissioning a thermostat to establish a wireless communication with a system controller for providing integrated zone control within the healthy home energy system according to an embodiment of the present invention. As shown, the method uses a combination of steps to establish an exclusive, dedicated communication channel between the thermostat device and the system controller, eliminating conflict between energy production/transfer and an auxiliary thermal load for a local conditioned zone. Other alternatives can also be provided where steps are added, one or more steps are removed, or one or more steps are provided in a different sequence without departing from the scope of the claims herein.

What is claimed is:

1. A system for providing space conditioning zone control in a building for efficient energy use and conservation of energy resources, the system comprising multiple air flow devices including at least an HVAC system and a thermal solar air flow system, the system comprising:

an energy transfer module coupled to a solar thermal system configured on a building structure, the building structure having one or more spatial zones, the energy transfer module being configured to receive a first air flow provided from the solar thermal system;

an auxiliary thermal module coupled to the energy transfer module for processing a return airflow from the one or more spatial zones to provide a conditioned airflow, the one or more spatial zones comprising at least a first spatial zone and a second spatial zone, the conditioned airflow being at least processed with humidity, temperature, or filters;

a first thermostat device configured to the first spatial zone, the first thermostat device comprising a first wireless communication device;
a second thermostat device configured to the second spatial zone, the second thermostat device comprising a second wireless communication device;
a zone controller coupled to the auxiliary thermal module, the zone controller being coupled to the first thermostat device and the second thermostat device, the zone controller having a first set of set points provided respectively by the first thermostat device and the second thermostat device for operating the auxiliary thermal module; and
a master control module coupled to the energy transfer module and the first thermostat device via the first wireless communication device and the second thermostat device via the second wireless communication device, the master control module being decoupled and free from direct communication with the zone controller and configured to indirectly communicate to the zone controller via either the first thermostat device or the second thermostat device, the master control module having a second set of setpoints for operating the energy transfer module for transferring either the first airflow or both the first airflow and the conditioned airflow to the one or more spatial zones.

2. The system of claim 1 wherein the solar thermal system comprises a combination of one or more solar thermal modules and one or more photovoltaic modules for generating thermal energy from solar energy source, and further comprises an air plenum structure for collecting the first airflow from ambient regions for carrying the thermal energy to the energy transfer module; wherein the master controller is configured with a program module to maintain operation of the HVAC system and the thermal solar air flow system free from conflict.

3. The system of claim 1 wherein the auxiliary thermal module includes an air handler unit coupled with an air conditioning module and a furnace module for processing the return airflow and generating the conditioned airflow; wherein the master controller is configured with a program module to maintain operation of the HVAC system and the thermal solar air flow system free from operating any zone in a different conditioning mode, the condition mode being a cooling mode, a heating mode, or a humidity mode.

4. The system of claim 3 wherein the zone controller is configured to directly receive information associated with space conditions in the one or more spatial zones and modes of operation from the thermostat devices respectively disposed therein, and to apply the information for operating either the air conditioning module in a cooling mode or the furnace module in a heating mode to determine a temperature range of the conditioned airflow based on the first set of setpoints and operating the air handler unit to deliver the conditioned airflow.

5. The system of claim 1 wherein the energy transfer module comprises an ETM controller, a first inlet for receiving the first airflow, a blower, one or more first outlets for the distribution of the first airflow, and a first damper disposed in each of the one or more first outlets.

6. The system of claim 5 wherein the master control module couples to the ETM controller for driving the blower to adjust a flow rate of the first airflow and operating the first damper to adjust a flux of the first airflow partially through each of the one or more first outlets.

7. The system of claim 6 wherein the master control module is configured to wirelessly receive information associated with a mode of operation of each thermostat device and an indoor temperature in each of the one or more spatial zones from the wireless communication device in each thermostat device disposed therein, and to communicate the information to the ETM controller for operating the blower and the first damper to deliver the first airflow based upon the second set of setpoints to the one or more spatial zones.

8. The system of claim 1 wherein each thermostat device comprises a touch-screen display for local control setting in an automatic mode configured to execute pre-programmed operation commands and a manual mode configured to allow a user to update or override the pre-programmed operation commands.

9. The system of claim 1 wherein the wireless communication device provided in each thermostat device comprises a wireless radio port configured for a Zigbee U-snap module for communicating with a Zigbee USB stick in the master control module.

10. The system of claim 1 wherein the master control module further comprises a virtual thermostat interface linked to a data server via Internet, the virtual thermostat interface allowing users to remotely input mode settings for each thermostat device, wherein the mode settings are transferred by the master control module via a wireless transmission to each thermostat device for updating the first set of setpoints in the zone controller.

11. The system of claim 1 wherein the first set of setpoints comprises at least a first cooling setpoint and a first heating setpoint per spatial zone, the second set of setpoints comprises a second cooling setpoint and a second heating setpoint per spatial zone, the second cooling setpoint being set higher than the first cooling setpoint to define a first comfort band for cooling season and the second heating setpoint being lower than the first heating setpoint to define a second comfort band for heating season, wherein an operation of the auxiliary thermal module is not initiated within the first comfort band during the cooling season and within the second comfort band during the heating season.

12. The system of claim 11 wherein master control module is configured to operate the energy transfer module in coordination with the operation of the auxiliary thermal module to provide the first airflow mixed with the conditioned airflow into the one or more spatial zones when indoor temperature in a spatial zone is higher than the second cooling setpoint above the first comfort band in the cooling season or lower than the second heating setpoint in the heating season below the second comfort band.

13. The system of claim 11 wherein the first comfort band and the second comfort band are varied depending on a daily period program, a weekly schedule program, and an occupancy program of each of the one or more spatial zones.

14. A method for providing space conditioning zone control to multiple spatial zones in a home energy system for efficient energy use and conservation of energy resources, the method comprising:
providing a home energy system including an energy transfer module, a solar thermal module, and an auxiliary thermal module associated with a building having one or more spatial zones, the one or more spatial zones including at least a first spatial zone and a second spatial zone;
initiating an operation of the energy transfer module by a system controller for delivering a first airflow collected by the solar thermal module;
transferring first information using a first wireless communication device from a first thermostat device to the system controller, the first thermostat device being configured with the first spatial zone and coupled to a zone controller configured with the auxiliary thermal module;

transferring second information using a second wireless communication device from a second thermostat device to the system controller, the second thermostat device being configured with the second spatial zone and coupled to the zone controller;

operating the system controller based upon a first set of setpoints in association with the first information and the second information for controlling at least a distribution of the first airflow to the one or more spatial zones, the system controller being decoupled and substantially free from direct communication with the zone controller; and initiating an operation of the auxiliary thermal module by the zone controller based upon a second set of setpoints for receiving a return airflow from the one or more spatial zones, processing the return airflow, and providing a conditioned airflow; providing the conditioned airflow to merge with the first airflow into the one or more spatial zones.

15. The method of claim 14 wherein the first set of setpoints comprises at least a first cooling setpoint and a first heating setpoint per spatial zone, the second set of setpoints comprises a second cooling setpoint and a second heating setpoint per spatial zone, the second cooling setpoint being set higher than the first cooling setpoint to define a first comfort band for cooling season and the second heating setpoint being lower than the first heating setpoint to define a second comfort band for heating season, wherein an operation of the auxiliary thermal module is not initiated within the first comfort band during the cooling season and within the second comfort band during the heating season to be in conflict with operation of the solar thermal module.

16. The method of claim 15 wherein the first comfort band and the second comfort band are programmable depending on a daily period program, a weekly schedule program, and an occupancy program of each of the one or more spatial zones.

17. The method of claim 14 wherein the initiating an operation of the energy transfer module comprises using the system controller to control a blower to set a flow rate for the first airflow and operate one or more air dampers to modulate the first airflow being respectively distributed to one or more first outlets.

18. The method of claim 17 wherein the initiating an operation of the auxiliary thermal module comprises using the zone controller to control an air conditioning module to provide cooled airflow in cooling season and control a furnace to provide heated airflow in heating season and control an air handler unit to distribute the conditioned airflow comprising the cooled or heated airflow towards one or more second outlets respectively through air dampers, the one or more second outlets being partially coupled with each of the one or more first outlets and respectively coupled to the one or more spatial zones.

19. The method of claim 14 wherein the system controller comprises a Zigbee USB stick, each of the first wireless communication device and the second wireless communication device comprises a Zigbee U-Snap module configured to mate with the Zigbee USB stick within a communication mode of operation set for the first thermostat device and the second thermostat device.

20. The method of claim 19 wherein the communication mode is set by commissioning each thermostat device with the system controller, the commissioning comprises:

powering down both the system controller and the thermostat device;

inserting the Zigbee U-snap module to the thermostat device;

inserting a battery to the thermostat device;

inserting the Zigbee USB stick to the system controller;

powering up the system controller;

forming a Zigbee network between the system controller and the thermostat device;

validating the Zigbee network;

closing the Zigbee network; and enabling the thermostat device by using the Zigbee network from a user interface associated with the system controller; wherein the system controller comprises a virtual thermostat interface for remotely setting temperature setpoints and modes of operation for each thermostat device based on one or more operation programs selected from a daily period program, a weekly schedule program, and/or an occupancy program of each of the one or more spatial zones, the modes of operation including heating mode, cooling mode, off mode, fan-auto mode, or fan-on mode for automatic operation or a manual mode for user override setting, the temperature setpoints and the modes of operation being transferred and updated between the system controller and each thermostat within a predetermined time period.

* * * * *